Nov. 12, 1957  A. J. GRANBERG  2,812,920
BULK PLANT DISPENSING SYSTEM
Filed Aug. 5, 1954  3 Sheets-Sheet 1

INVENTOR.
ALBERT J. GRANBERG
BY Bruce & Brosler
HIS ATTORNEYS

Nov. 12, 1957  A. J. GRANBERG  2,812,920
BULK PLANT DISPENSING SYSTEM
Filed Aug. 5, 1954  3 Sheets-Sheet 2

INVENTOR.
ALBERT J. GRANBERG
BY
Bruce & Brosler
HIS ATTORNEYS

Nov. 12, 1957 A. J. GRANBERG 2,812,920
BULK PLANT DISPENSING SYSTEM
Filed Aug. 5, 1954 3 Sheets-Sheet 3

INVENTOR.
ALBERT J. GRANBERG
BY
Bruce & Brosler
HIS ATTORNEYS

United States Patent Office 2,812,920
Patented Nov. 12, 1957

2,812,920

BULK PLANT DISPENSING SYSTEM

Albert J. Granberg, Oakland, Calif.

Application August 5, 1954, Serial No. 448,041

8 Claims. (Cl. 251—68)

My invention relates to systems in general, for the dispensing and measuring of liquid dispensed, and more particularly to a bulk plant dispensing system for the dispensing of gasoline and related liquid products, though it will be apparent from the following description of the invention in its preferred form, that the same has other applications.

Among the objects of my invention are, (1) To provide a novel and improved liquid dispensing and measuring system;

(2) To provide a novel and improved liquid dispensing system permitting control from a remote point, of the dispensing of liquid through such system;

(3) To provide a novel and improved liquid dispensing system adapted to accurately dispense a quantity of liquid, predetermined by an operator at a remote point;

(4) To provide a novel and improved liquid dispensing system which is normally locked against use, but which may be conditioned for use, from a point removed from the flow lines of the system;

(5) To provide a novel and improved liquid dispensing system wherein the possibility of error is minimized;

(6) To provide a novel and improved liquid dispensing system which may be quickly controlled as to shut off, from a point removed from the flow lines of the system; and (7) To provide a novel and improved liquid dispensing system which may be shut off without shock, from a point removed from the flow lines of the system.

Additional objects of my invention will be brought out in the following description of a preferred embodiment of the same, taken in conjunction with the accompanying drawings wherein, Figure 1 is a view depicting a general layout of a system embodying the features of the present invention;

Figure 1:
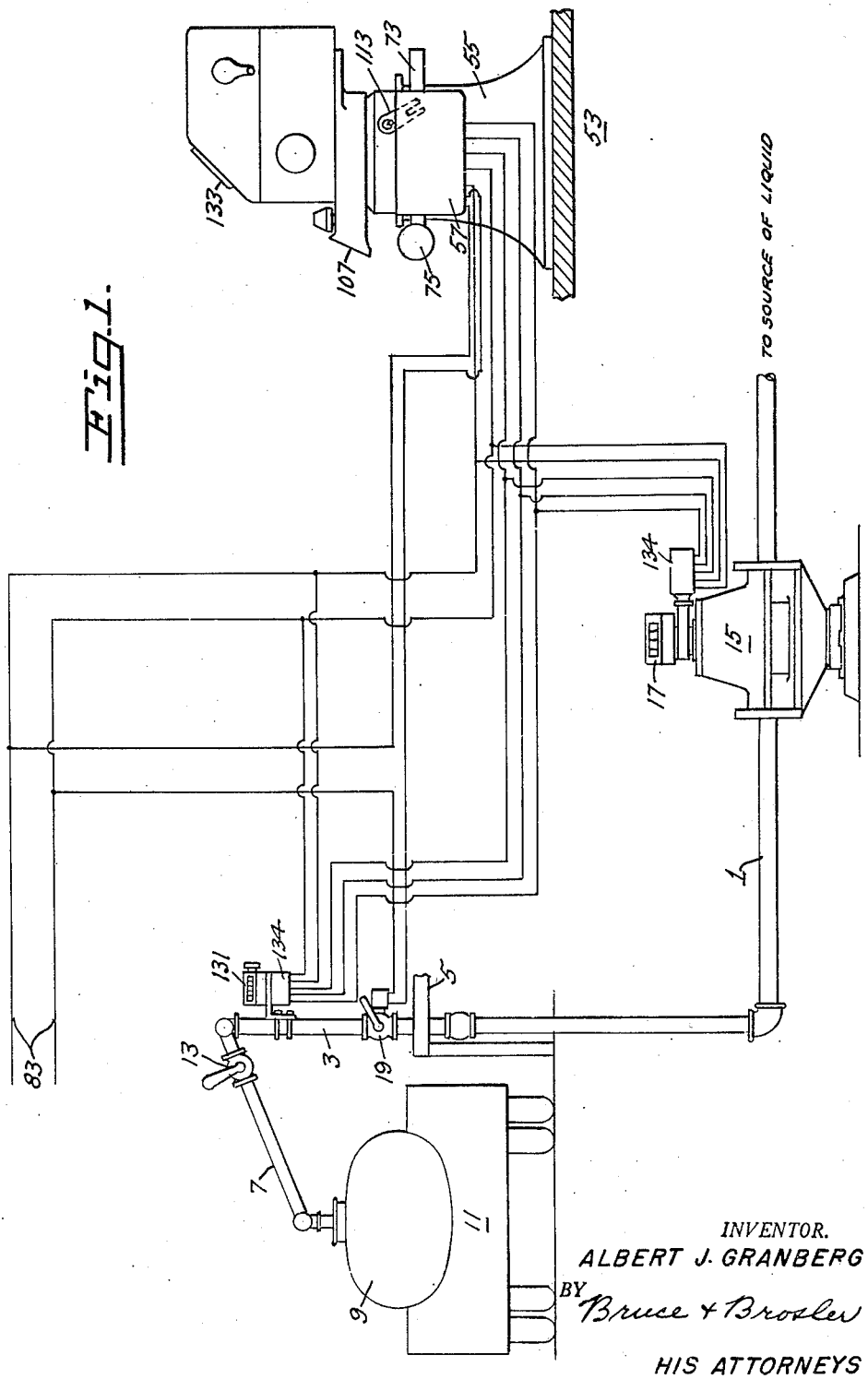
Figure 2:
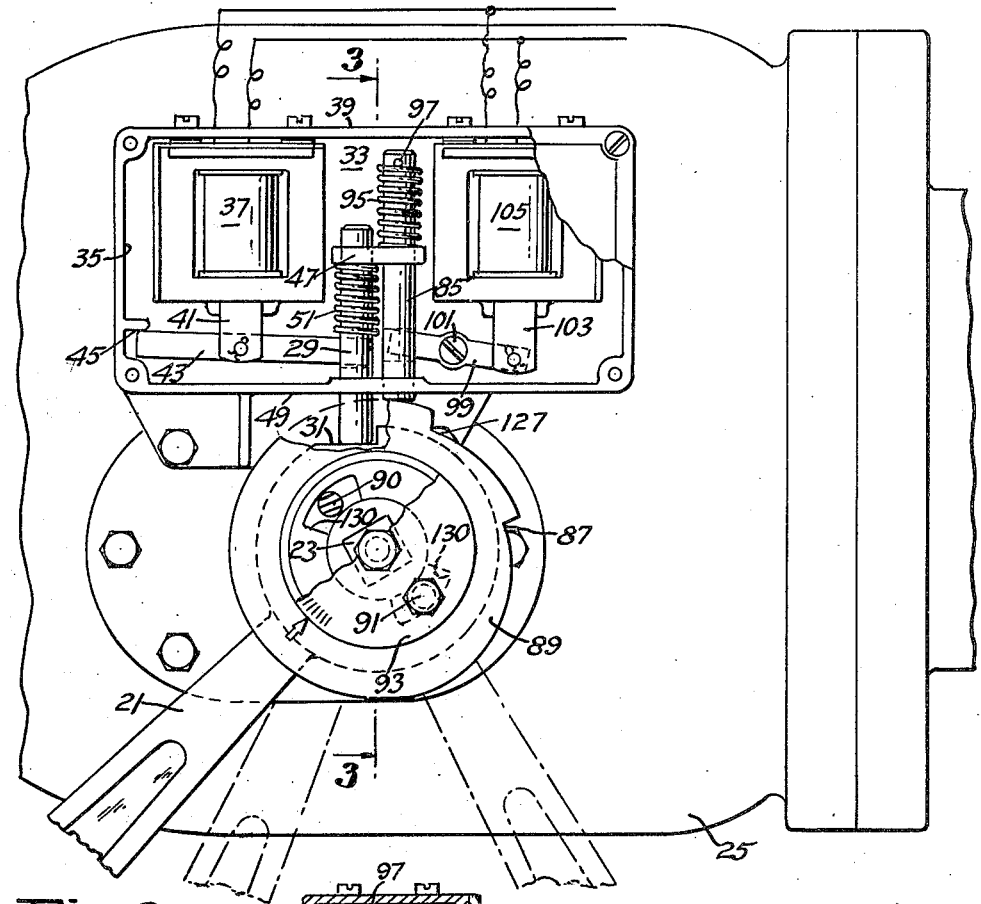
Figure 2 is a view in elevation of a solenoid operated valve, with the solenoid operating mechanism exposed.
Figure 3:
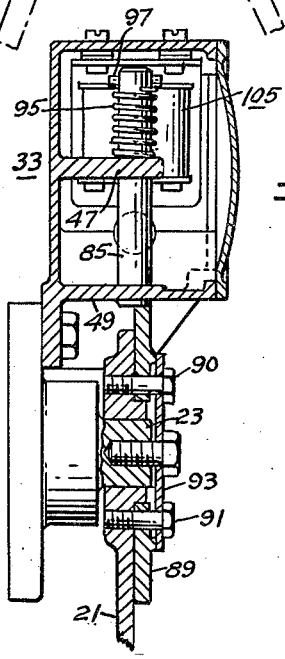
Figure 3 is a view in section taken in the plane 3—3 of Figure 2.
Figure 4:
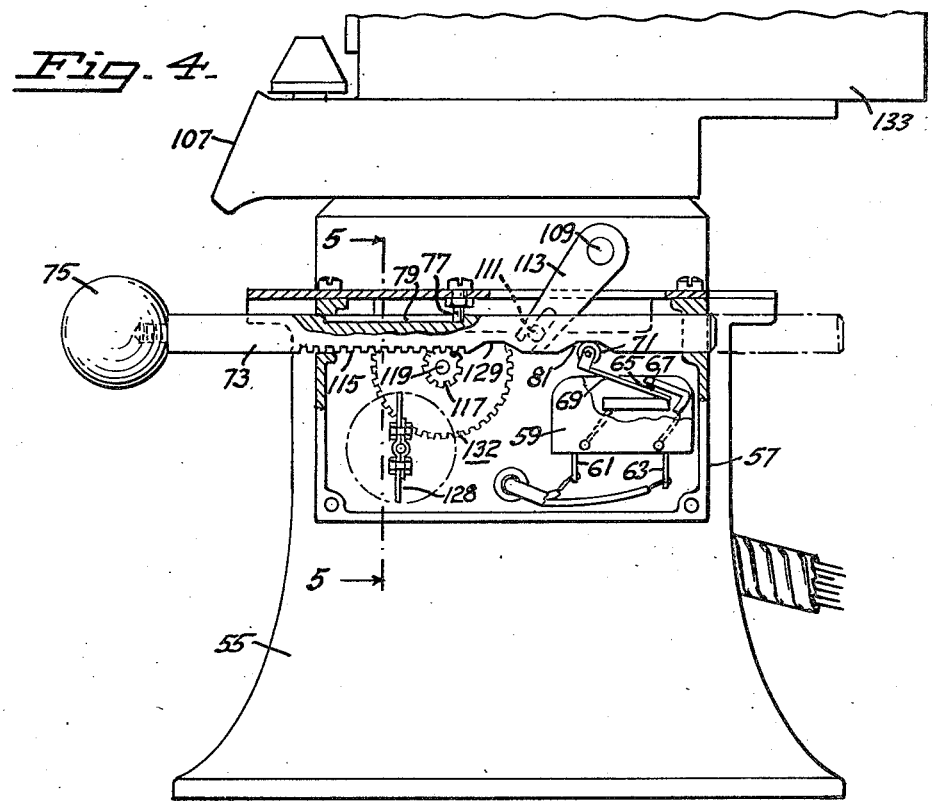
Figure 4 is a view in elevation of a control assembly, partly broken away to expose features thereof.
Figure 5:
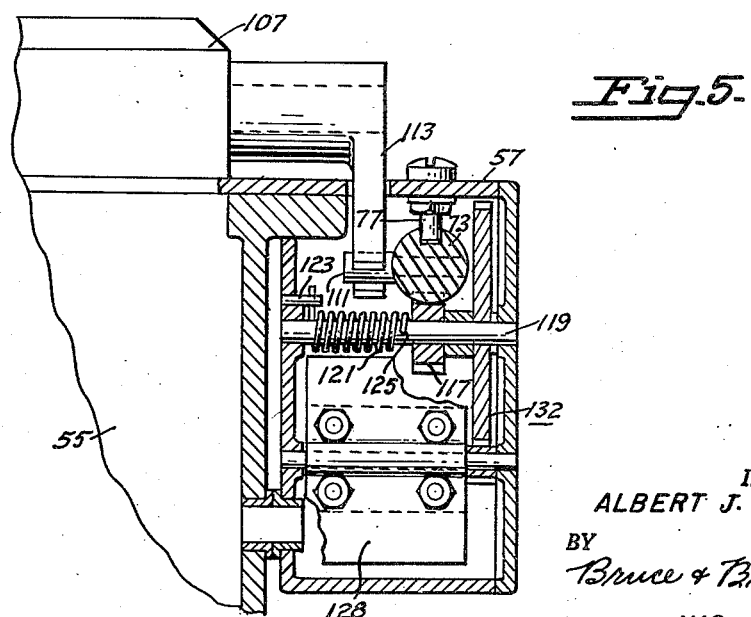
Figure 5 is a fragmentary view in section taken in a plane 5—5 of Figure 4.

Referring to the drawings for details of my invention in its preferred form as applied to a bulk plant dispensing system, such system involves a flow line 1 leading from a source of liquid supply (not shown), and terminating at the dispensing end, in a vertical column 3 extending upwardly through a loading platform 5, and from the upper end of which column, extends a loading stem 7 for directing liquid into the tank 9 of a tank truck 11 during a dispensing operation.

In the loading stem and within reach of an operator standing on the loading platform, is a manually operable valve 13 for enabling such operator to manually control the flow of liquid from the system into the tank, when the system is conditioned for operation. While any suitable type of valve may be so employed, I prefer to use the balanced slow closing valve assembly of my Patent No. 2,557,378 of June 19, 1951.

In the flow line, at some convenient location, usually at some distance from the loading platform, is a liquid meter 15 including a counter 17 mounted on the casing thereof to indicate the quantum of liquid flowing through such line.

In the column there is included a normally closed valve assembly 19, which so long as it remains closed, will prevent dispensing of liquid from the system, regardless of any manipulations of the valve 13 in the loading stem. While any one of many conventional valves may be suitable for use at this point in the system, I prefer to employ the slow seating valve assembly forming the subject matter of my pending application, Serial No. 279,059 filed March 28, 1952, now Patent No. 2,698,158. Such valve assembly includes a spring biased handle 21 mounted on the squared end 23 of a stub shaft emerging from the housing 25 of the assembly. The valve assembly is preferably located in the column at a point slightly above the loading platform where the handle will be within convenient reach of the foot of the operator for actuation thereby.

This valve assembly is normally maintained locked in its normally closed condition by a locking pin 29 entering a notch 31 in the attached end of the handle 21, when the handle occupies the position representative of the closed condition of the valve in the valve assembly.

The locking pin constitutes an element of a solenoid assembly 33 enclosed within a casing 35 bolted to the housing of the valve assembly. A solenoid 37 suspended from the roof 39 of the casing, has its plunger 41 secured to an intermediate point of a lever 43, one end of which is fulcrumed under a shoulder 45 on an end wall of the casing, while the other end of the lever is secured to the locking pin. The locking pin, in turn, is slidably mounted at one end in a guide bracket 47 extending inwardly from the rear wall of the casing, and at its other end, in the floor 49 of the casing. A compression spring 51 disposed about the locking pin, between the guide bracket and the supporting lever, normally urges the locking pin in the direction of locking.

Electrical energization of the solenoid will serve to lift the locking pin against the compressive force of the spring to unlock the valve assembly. So long therefore, as the locking pin engages the particular notch in the handle, dispensing of liquid from the system is precluded.

Unlocking of such valve means in the system of the present invention, is provided for from a dispatcher's station, 53, somewhat removed from the flow line of the system. The unlocking control means at such dispatcher's station, involves a base 55 to the side of which is mounted a small casing 57 in which is housed a normally closed micro-switch 59 having a pair of leads 61, 63 extending from the switch contacts 65, 67 therein, through a wall of the casing for a connection to an external circuit. One of the switch contacts 65 is located on an armature 69 extending upwardly from the switch assembly and terminating in a roller 71.

A slide bar 73 supported in the end walls of the casing 57, terminates externally of the casing in a knob 75 for manually shifting the bar between permissive limits of travel as determined by a travel limiting pin 77 mounted in the roof of the casing and entering a groove 79 formed in the bar for the reception thereof.

The micro-switch is so located as to cause the switch roller to ride against the normal undersurface of the slide rod which serves to hold the switch open until the roller enters a notch formed in the slide bar to a sufficient depth to permit closing of the switch contacts. Such a notch 81 is located to receive the switch roller when the slide bar is pulled to its extreme out position. By connecting the unlocking solenoid 37 to a source 83 of electric current, through the micro-switch, it will become apparent that when the slide bar is pulled to its extreme out position, the unlocking solenoid will become energized and retract the locking pin and permit the handle of the valve assembly to be manipulated in the direction of opening the valve.

With the valve assembly thus adjusted to its open condition, it is latched in such condition by a latching pin 85 adapted to enter a notch 87 provided in the periphery of a ring shaped latching plate 89, such plate being retained against the mounted end of the handle by a pair of bolts 90, 91 passing through a ring plate clamping disc 93 and threadedly engaging the handle. This latching pin, like the locking pin, is slidably supported at one end in the guide bracket 47 and at its other end, in the floor of the casing, but is normally held out of latching position by a compression spring 95 disposed about the latching pin between the bracket and a stop pin 97 passing through the upper end of the latching pin.

Like the locking pin, the latching pin is mounted at the end of a lever 99 which is fulcrumed on a pin 101 and connects at its other end to the plunger 103 of a second solenoid 105, whereby upon energization of this solenoid, the latching pin will be forcibly directed toward the latching plate to enter the latching notch 87 when in line therewith. Once latched, the valve assembly will remain open so long as the latching solenoid remains energized, and in spite of the closing force of the spring normally present in the remote controlled valve assembly and acting in the direction of restoring the valve and the handle to their closed positions.

The surface of the notch 87 engaged by the latch pin in holding the valve open, is preferably sloped at a slight angle to facilitate removal of the latch pin, so that when the associated solenoid becomes deenergized, the combined effect of the latch pin spring 95 and the valve assembly spring will force the latch pin out of latching engagement with the latching plate and permit closing of the valve assembly and subsequent locking thereof by engagement with the locking pin.

With the valve assembly in its open condition, an operator on the loading platform may manipulate the loading stem valve 13 to dispense liquid from the system into a tank truck or any other receptacle, until such time as the valve assembly again becomes locked in its closed condition.

In a system of the type under consideration, the quantity of liquid to be dispensed is known in advance, and to place it within the power of a dispatcher to control the closing of the valve of the valve assembly and at the precise point when such quantity of liquid has been dispensed, a shifting of the slide bar from its out position to its in position, which opens the solenoid circuits and closes the remote controlled valve, is initiated by a precontrol counter 107 mounted on the base at the dispatcher's station and coupled to the slide bar.

A precontrol counter is a device which can be preset to shut off a valve in a flow line at the precise moment when the predetermined quantum of liquid has been dispensed. While any suitable mechanism of this type might be employed in the system of the present invention, I prefer to utilize that of my Patent No. 2,655,285 of October 13, 1953, primarily because it has incorporated therein, means for cooperation with the remote controlled valve, to effect closing of such valve in two steps, whereby at the initiation of the first step, the valve assembly will be shut down to approximately ten or fifteen percent of its full flow capacity and continue in such reduced capacity until initiation of the second closing step, whereby the valve assembly will be shut completely.

The advantages of such two step closing of the valve assembly lies in the fact that it not only permits settling of the foam in the tank of the truck into which the liquid is being dispensed, but the rate of flow of the liquid in the system will be cut down to such a degree that a precise cut off of flow may be realized when the precontrol counter indicates that the desired quantum of liquid has been delivered.

In accordance with prior conventional application of precontrol counters, such devices are mounted on the meter with the precontrol counter coupled thereto, whereby in response to liquid flow through the meter, the precontrol counter will register until the desired quantity of liquid has passed through the meter, at which instant, the counter will unlatch a shaft 109 to which is coupled the handle of a spring biased valve, whereby such valve then becomes free to close.

As incorporated into the present system, the latch controlled shaft of the precontrol counter is coupled to a pin 111 on the slide bar by a forked lever 113 which straddles the pin. The slide bar in turn is spring biased toward its in position, whereby upon unlatching of the controlled shaft, the slide bar will be free to move in the direction of closing.

To accomplish such biasing of the slide bar, the slide bar is provided with teeth 115 along a portion of its under surface, which are engaged by a pinion 117 mounted on a shaft 119 which extends between and is journalled in opposing side walls of the casing. A torsion spring 121 disposed about this shaft between the pinion and one of the side walls, has one end anchored to a stud 123 on such side wall while the other end of the spring is anchored in a hole 125 in the shaft.

With only the one notch formed in the under side of the slide bar, the release of the slide bar by the precontrol counter and its resultant movement toward its in position, will serve to open the micro-switch and de-energize both solenoids, whereby the valve assembly will be restored to its fully closed condition and then locked by the locking pin. Such a one step closing might not provide sufficient time for the foam in the tank truck to settle and thus cause a foaming over, and also might make it rather difficult to effect a shut off of the valve at the precise moment when the desired amount of liquid has been dispensed.

Accordingly, provision is made for a partial closing of the valve assembly at some point prior to complete fulfillment of the discharge requirements, so that the rate of flow of liquid in the line will be cut down to say ten to fifteen percent of the full flow rate for a short period of time prior to shut off.

The means for accomplishing this two step shut down of the valve assembly, in part involves the provision of a second or intermediate notch 127 in the latching plate, and a second notch 129 in the lower surface of the slide bar. Also in this connection, it must be assured that the in movement of the slide bar in response to the restoring action of its associated spring, shall be at a rate such that the micro-switch roller will enter the second notch before the latch pin of the valve assembly reaches the second notch on the latching disc. This interposes no difficulty by reason of the fact that the valve assembly is of the slow closing slow seating type and therefore offers adequate time for the micro-switch roller to enter the second notch in the slide bar. The point in the dispensing period at which the flow rate is reduced will vary with the size of the pipe line of the particular system, but when once determined, the precontrol counter is set to unlatch its shaft 109 the first time, the moment that point in the dispensing period is reached. At such moment, the slide bar moves under action of the spring 121 toward its in position sufficiently to permit the switch roller to enter the second notch before the shaft 109 is again latched to hold the slide bar in such position for the remainder of the filling period, when the precontrol counter will again unlatch the shaft and permit complete restoration of the slide bar to its in position.

During travel of the switch roller from the one notch to the other, it becomes apparent that the switch becomes open for the very brief period of time it takes the roller to make such shift, such period of time being sufficient to permit de-energization of the solenoids, which in turn permits the latching pin to be forcibly withdrawn from its notch, whereupon the valve and its handle will start moving toward their closed positions. However, before the valve and handle have an opportunity to move very far in the closing direction, the switch roller will enter the second notch and again energize the solenoids to forcibly bring the latching pin against the edge of the latching plate 89 in time to enter the second notch and hold the valve in a partially open position.

From this time on to the completion of the dispensing period, the flow in the system will be at a very materially reduced rate, which will permit of the settling of the foam previously generated in the tank of the truck and also permit of a precise shutting down of the system when the precontrol counter shuts down. When this occurs, the completion of the movement of the slide bar to its in position will again disconnect the micro-switch and de-energize the solenoids, whereupon the valve assembly will completely shut off and the locking pin will be free to enter its notch to again lock the valve assembly against opening, except when permitted by the operator at the dispatcher's station.

Smooth movement of the slide bar may be assured by coupling thereto a governor in the form of a fan 128 driven from the shaft 119 through a gear train 132.

The closing time of the valve assembly, and more particularly the time of the final closing step, may be made adjustable by permissive adjustment of the latching plate, which results in a shift of the notches in the open condition of the valve assembly. This is made possible by providing notches 130 along the inner edge of the ring plate where the clamping bolts pass. With such an arrangement, the closing of the valve assembly may be precisely coordinated with the counters in the system to assure halt of liquid flow at the proper moment.

The precontrol counter is controlled from the meter, and likewise a counter 131 mounted on the column within view of the operator working on the loading platform. Such manner of control is made possible through the utilization of Selsyn motors, 134, there being one mounted in connection with each of the aforementioned devices, with all motors interconnected so that the lead motor associated with the meter will produce changes in both the precontrol counter and the counter at the operator's platform corresponding to the readings of the meter, thus affording the operator on the platform a means of checking against both the meter readings and the proper working of the precontrol counter at the dispatcher's station.

To obtain a permanent record of the liquid dispensed through the pipe line of the system, a recording counter 133 may be mounted on the precontrol counter at the dispatcher's station and coupled to the precontrol counter, thus in effect remotely controlling this device also from the meter.

It will be apparent from the foregoing description of my invention in its preferred form, that it fulfills all the objects attributed thereto, and while I have disclosed the same in considerable detail, it is subject to alteration and modification without departing from the underlying principles involved. I, accordingly do not desire that my protection be limited to such details as I have illustrated and described except as may be necessitated by the appended claims.

I claim:

1. A remotely controllable valve assembly system comprising a valve housing having a valve controllable shaft emerging therefrom, a handle affixed to said shaft and having a notch therein, a locking pin, means supporting said locking pin in position to enter said notch with said handle in a position representing a predetermined condition of said valve assembly, electrically operated means energizable from a remote point for determining movement of said locking pin with respect to said notch, a latch plate bolted to said handle and constituting in effect, a part of said handle, said latch plate having a notch therein, a latching pin, means supporting said latching pin in position to enter said notch with said handle in a position representing a different condition of said valve assembly, said latch plate having a second notch located in a position to receive said latching pin with said handle in a position representing an intermediate condition of said valve assembly, and electrically operated means energizable from a remote point for determining movement of said latching pin, and means, remote from said valve assembly for energizing said electrically operated means, said remote means including a normally closed switch having an armature, means connecting said switch and electrically operated means in circuit across a power supply, a slide bar in pressure engagement with said switch armature to hold said switch open, said bar having a plurality of notches to receive said armature during movement of said bar from a starting position to a latching position and permit closing of said switch when said armature enters one of said notches, means following release of said bar from said latching position, for moving said bar toward its starting position, and control means for smoothing out such movement of the bar toward its starting position.

2. A remotely controllable valve assembly system comprising a valve housing having a valve controllable shaft emerging therefrom, a handle affixed at one end to said shaft and having a notch in said end, a locking pin, means supporting said locking pin in position to enter said notch with said handle in a position representing a predetermined condition of said valve assembly, electrically operated means for determining movement of said locking pin with respect to said notch, a latch plate bolted to the affixed end of said handle and constituting in effect, a part of said handle, said latch plate having a notch therein, a latching pin, means supporting said latching pin in position to enter said notch with said handle in a position representing a different condition of said valve assembly, said latch plate having a second notch located in a position to receive said latching pin with said handle in a position representing an intermediate condition of said valve assembly, and electrically operated means for determining movement of said latching pin, and means permitting adjustment of said latch plate to change the prevailing conditions of said valve assembly when latching occurs, and means, remote from said valve assembly for energizing both said electrically operated means, said remote means including a normally closed switch having an armature, means connecting said switch and both said electrically operated means in circuit across a power supply, a slide bar in pressure engagement with said switch armature to hold said switch open, said bar having a plurality of notches to receive said armature during movement of said bar from a starting position to a latching position and permit closing of said switch when said armature enters one of said notches, means following release of said bar from said latching position, for moving said bar toward its starting position, and control means for smoothing out such movement of the bar toward its starting position.

3. A remotely controllable valve assembly comprising a valve housing having a valve controllable shaft emerging therefrom, a handle affixed at one end to said shaft and having a notch in said end, a locking pin, means supporting said locking pin in position to enter said notch with said handle in a position representing a predetermined condition of said valve assembly, means energizable from a remote point for determining movement of said locking pin with respect to said notch, a latch plate on the affixed end of said handle and constituting in effect, a part of said handle, said latch plate having a notch therein, a latching pin, means supporting said latching pin in position to enter said notch with said handle in a position representing a different condition of said valve assembly, and means also energizable from a remote point for determining movement of said latching pin.

4. A remotely controllable valve assembly comprising a valve housing having a valve controllabe shaft emerging therefrom, a hande affixed at one end to said shaft and having a notch in said end, a locking pin, means supporting said locking pin in position to enter said notch with said handle in a position representing a predetermined condition of said valve assembly, electrically operated means energizable from a remote point for determining movement of said locking pin with respect to said notch, a latch plate on the affixed end of said handle and constituting in effect, a part of said handle, said latch plate having a notch therein, a latching pin, means supporting said latching pin in position to enter said notch with said handle in a position representing a different condition of said valve assembly, said latch plate having a second notch located in a position to receive said latching pin with said handle in a position representing an intermediate condition of said valve assembly, and electrically operated means also energizable from a remote point for determining movement of said latching pin.

5. A remotely controllable valve assembly comprising a valve housing having a valve controllable shaft emerging therefrom, a handle affixed at one end to said shaft and having a notch in said end, a locking pin, means supporting said locking pin in position to enter said notch with said handle in a position representing a predetermined condition of said valve assembly, electrically operated means energizable from a remote point for determining movement of said locking pin with respect to said notch, a latch plate on the affixed end of said handle and constituting in effect, a part of said handle, said latch plate having a notch therein, a latching pin, means supporting said latching pin in position to enter said notch with said handle in a position representing a different condition of said valve assembly, said latch plate having a second notch located in a position to receive said latching pin with said handle in a position representing an intermediate condition of said valve assembly, and electrically operated means also energizable from a remote point for determining movement of said latching pin, and means permitting adjustment of said latch plate to change the prevailing conditions of said valve assembly when latching occurs.

6. Means for use in remotely controlling a remotely controllable valve assembly, comprising a normally closed switch having a pressure responsive element for opening said switch, a slide bar in engagement with said pressure responsive element to hold said switch open and having a plurality of notches to receive said pressure responsive element during movement of said slide and permit closing of said switch, and means responsive to rotational movement of a shaft for moving said slide bar from a starting position to a latching position, and means for latching said slide bar when moved to said latching position.

7. Means for remotely controlling a remotely controllable valve assembly, comprising a normally closed switch having a pressure responsive element for opening said switch, a slide bar in engagement with said pressure responsive element to hold said switch open and having at least one notch to receive said pressure responsive element during movement of said slide bar and permit closing of said switch, means for moving said slide bar from a starting position to a latching position, and means following release of said slide bar from said latching position, for moving the same toward its starting position.

8. Means for use in remotely controlling a remotely controllable valve assembly, comprising a normally closed switch having a pressure responsive element for opening said switch, movable means in engagement with said pressure responsive element to hold said switch open and having a plurality of notches to receive said pressure responsive element during movement of said movable means and permit closing of said switch, means responsive to rotational movement of a shaft for moving said movable means from a starting position to a latching position, means following release of said movable means from said latching position, for moving the same toward its starting position, and governor means for smoothing out such movement of said movable means toward its starting position.

References Cited in the file of this patent

UNITED STATES PATENTS

| | | |
|---|---|---|
| 1,085,646 | Tracy | Feb. 3, 1914 |
| 1,459,686 | O'Borman | June 19, 1923 |
| 1,534,955 | Horak | Apr. 21, 1925 |
| 1,659,843 | Trottier | Feb. 21, 1928 |
| 2,167,448 | Feld | July 25, 1939 |
| 2,116,777 | Brayer | May 10, 1938 |
| 2,538,243 | Hayard et al. | Jan. 16, 1951 |
| 2,612,288 | Hayard | Sept. 30, 1952 |
| 2,634,884 | Bliss | Apr. 14, 1953 |

FOREIGN PATENTS

| | | |
|---|---|---|
| 617,291 | Germany | Aug. 16, 1935 |
| 829,585 | Germany | Jan. 28, 1952 |